United States Patent Office 2,931,764
Patented Apr. 5, 1960

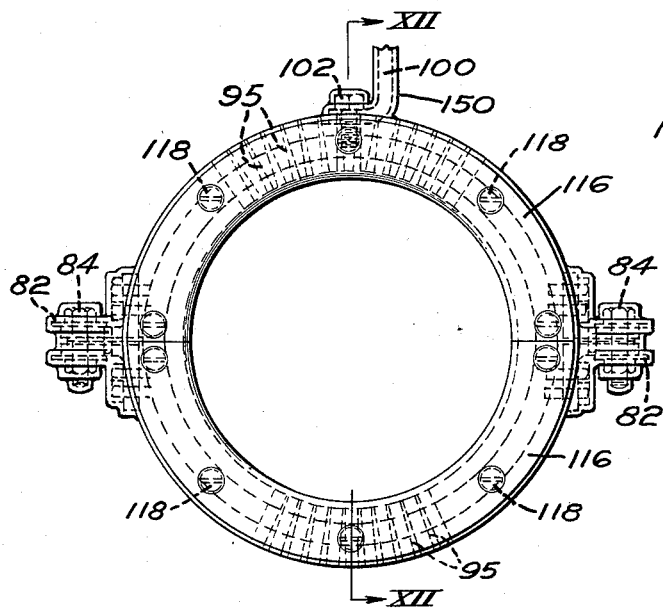
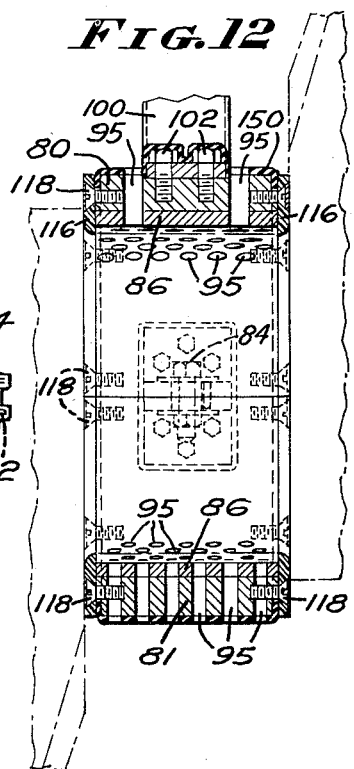
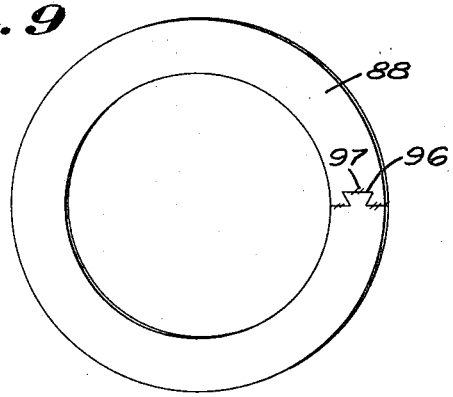
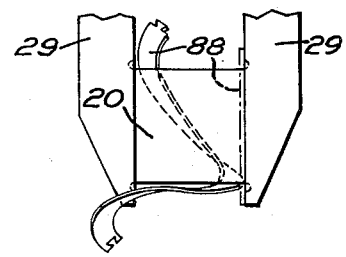
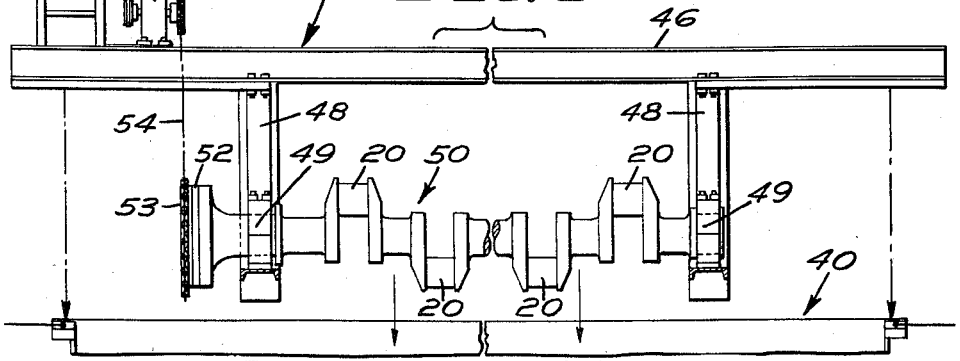

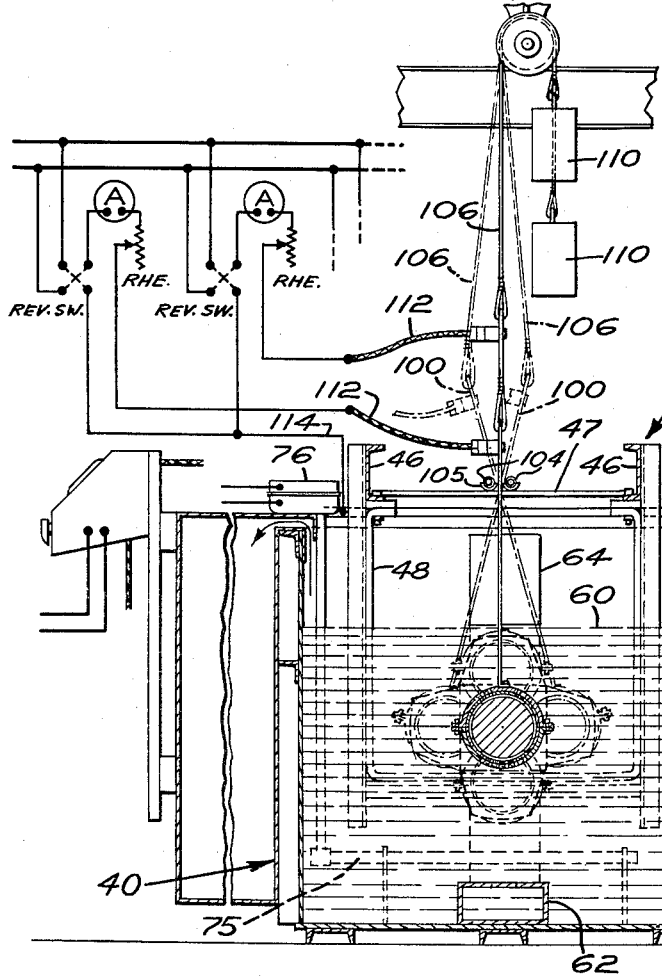
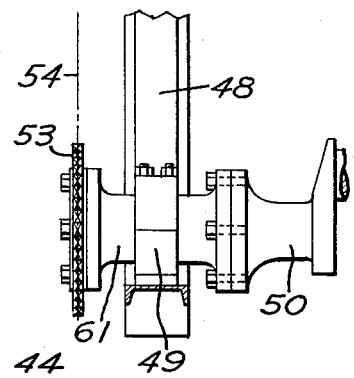
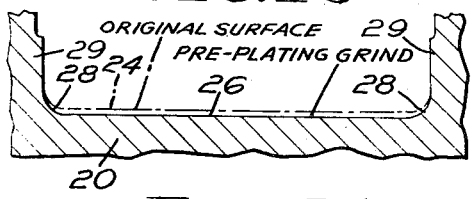
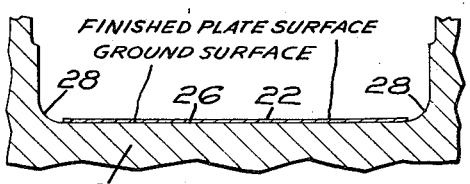
INVENTOR:
RUSSELL PYLES

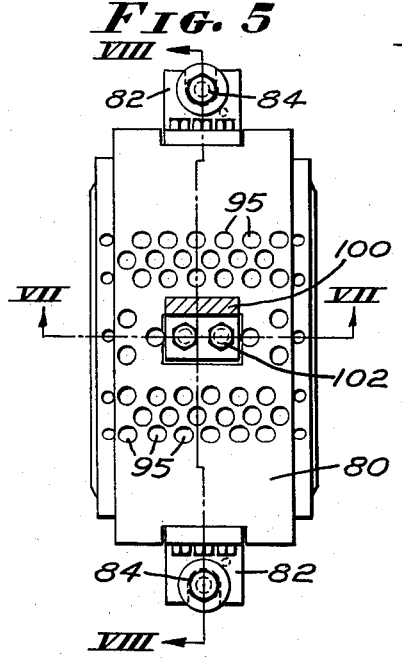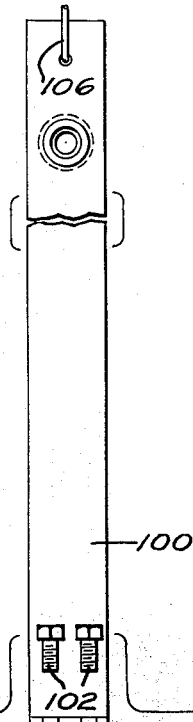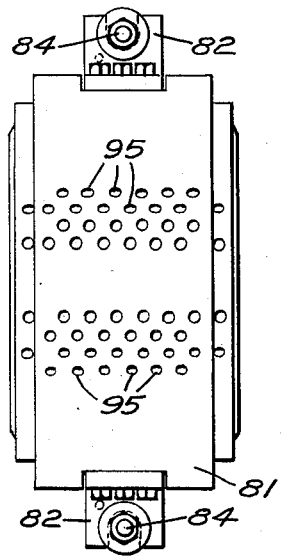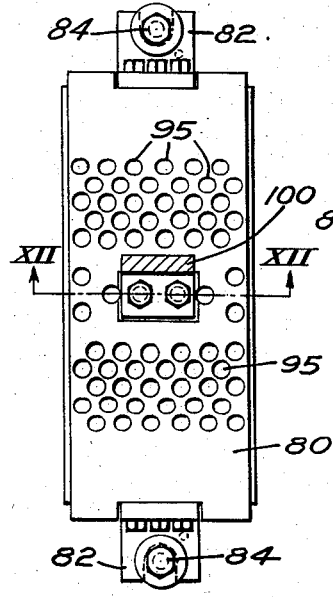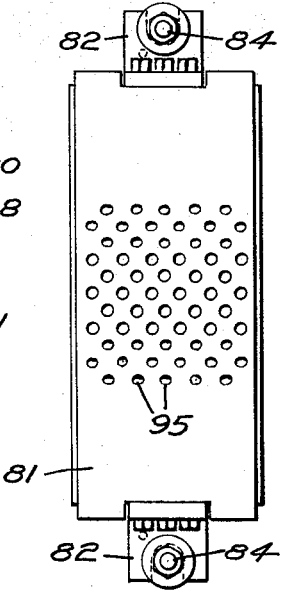

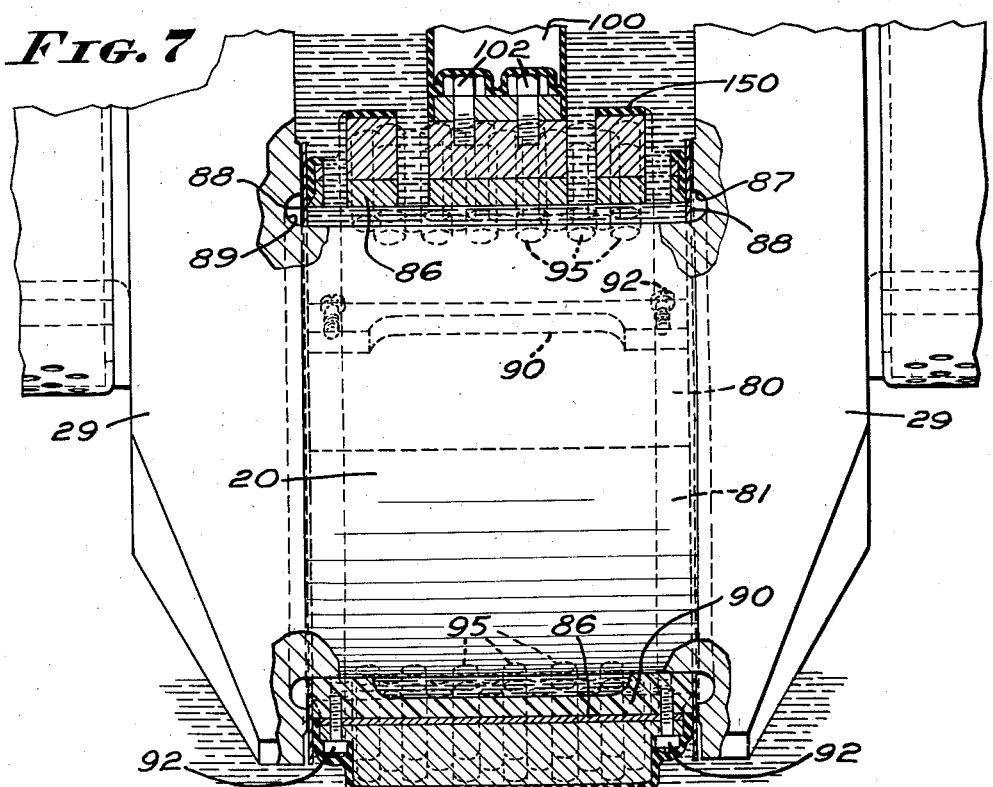
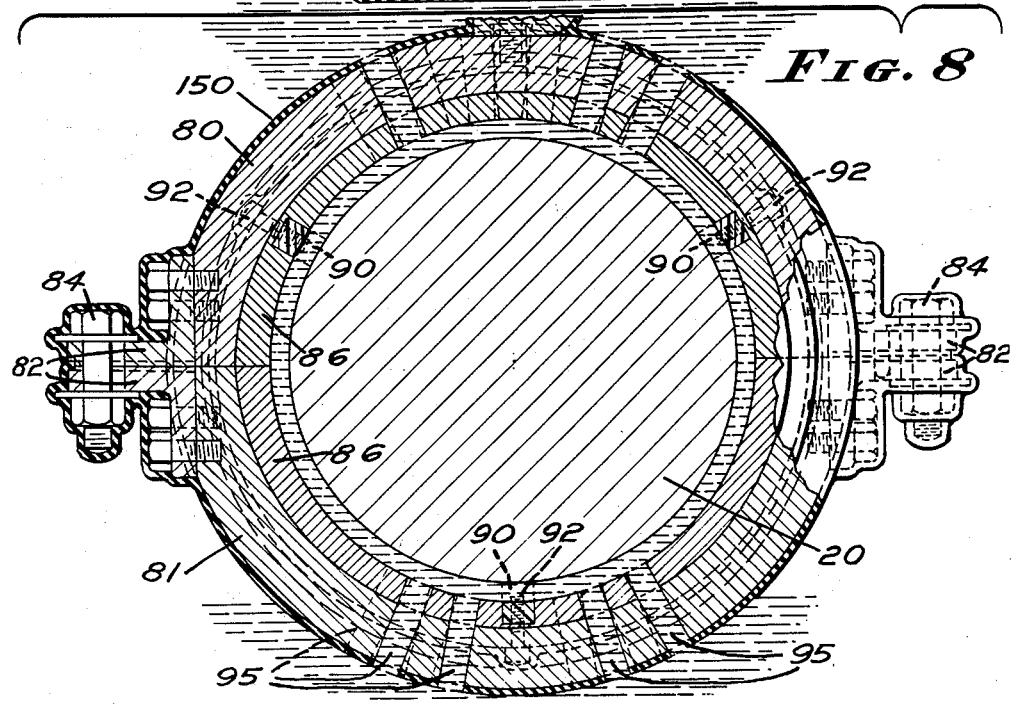

2,931,764

APPARATUS FOR ELECTROPLATING BEARING SURFACES OF A CRANKSHAFT

Russell Pyles, Olean, N.Y., assignor to Van Der Horst Corporation of America, Olean, N.Y.

Application March 29, 1956, Serial No. 574,780

5 Claims. (Cl. 204—212)

This invention relates to means for plating the bearing surfaces of engine crankshafts such as with chromium, as referenced for example in U.S. Patents 1,861,272, 1,880,382, and 2,530,677.

Generally stated, the apparatus of the invention comprises a tank holding the electrolyte or chromium plating bath; a fixture adapted to receive a crankshaft in rotatable relation therein, and being in turn adapted to be lowered into the plating tank; cylindrical anodes arranged to encircle the crankshaft bearing surfaces to be plated in spaced concentric relation thereon; means for driving the crankshaft to rotate while the anodes are restrained to follow said rotation with only planetary motions; and means for transmitting plating current through the anodes to the surfaces to be plated. The present invention provides improvements in components of the apparatus hereinabove referred to.

One of the objects of the invention is to provide in an apparatus of the character described improved anode means for rotatable mounting on the bearing portions of a crankshaft, to attain precise positional proximity and conformation between the anodes and the associated cathode surfaces.

Another object of the invention is to provide in an apparatus as aforesaid, an improved anode construction completely enclosing the surfaces to be plated and insulating them against stray currents and current losses; thereby obtaining more uniform current density and current distribution and metal deposition over the surfaces being processed.

Another object is to provide in an anode construction as aforesaid improved end plate devices functioning as masking rings for control of the plating operation.

Another object of the invention is to provide improved means for counterweighting the anodes and their electrical connection devices.

Another object is to provide in an apparatus as aforesaid, an improved plating tank and electrolyte control system.

Other objects and advantages of the invention will appear in the specification hereinafter.

In the drawings:

Fig. 2 is a fragmentary side elevational view of the crankshaft and its carrying fixture, prior to lowering it into the plating tank;

Fig. 3 is a fragmentary sectional view taken along line III—III of Fig. 1;

Fig. 4 is an "exploded" end elevational view of a crankshaft pin anode of the invention, and its electrical connection components;

Fig. 5 is a top plan view of the pin anode assembly of Fig. 4;

Fig. 6 is a bottom plan view of the assembly of Fig. 5;

Fig. 7 is a fragmentary sectional view, on an enlarged scale, taken along line VII—VII of Fig. 5; and showing the anode assembly after having been dipped in masking plastic;

Fig. 8 is a sectional view, on an enlarged scale, taken along line VIII—VIII of Fig. 5; and showing the anode assembly as having been coated with masking plastic;

Fig. 9 is a side elevational view of a masking ring component of the assembly of Figs. 7, 8;

Fig. 10 is a view showing method of assembly of the ring of Fig. 9 upon the crankshaft pin, preparatory to mounting of the pin anode thereon;

Fig. 11 is a view corresponding to Fig. 8, but showing a crankshaft main bearing anode subsequent to being coated with masking plastic;

Fig. 12 is a fragmentary sectional view taken along line XII—XII of Fig. 11;

Fig. 13 is a view corresponding to Fig. 5, but showing in top plan view the main bearing anode assembly of Figs. 11–12;

Fig. 14 is a bottom plan view of the main bearing anode assembly of Figs. 11–13;

Fig. 15 is a fragmentary sectional view through a crankshaft bearing portion, showing a finished surface-plating as provided thereon in accord with the method and apparatus of the invention;

Fig. 16 is a view corresponding to Fig. 15, but illustrating the condition of the bearing portion prior to processing;

Fig. 17 is a view corresponding to Fig. 16, but illustrating the condition of the bearing structure at an intermediate stage of the processing thereof; and Fig. 18 is a fragmentary elevational view corresponding to a portion of Fig. 1, but showing an alternative means for mounting a crankshaft to be plated in its fixture.

Figure 1:
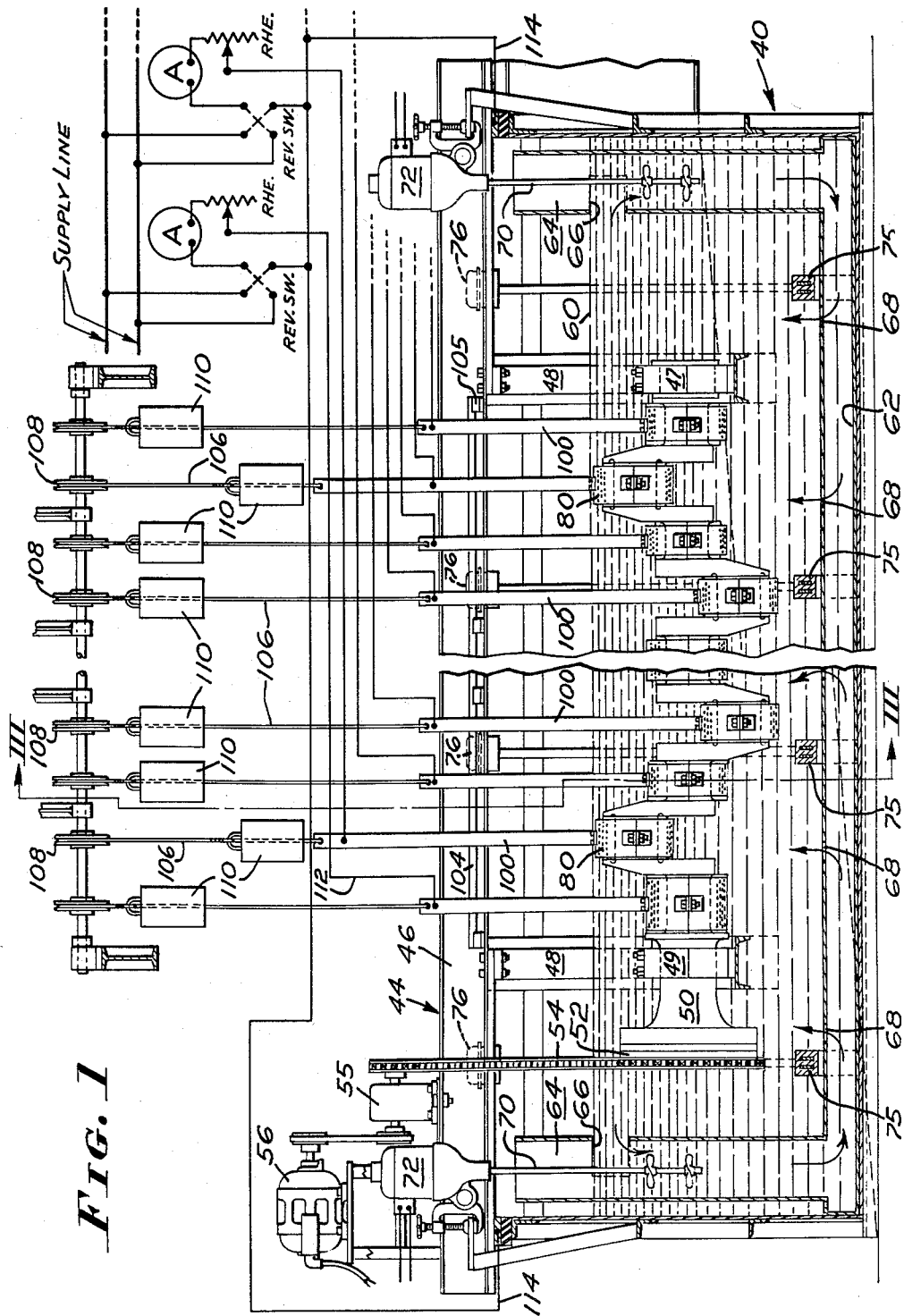
Fig. 1 is a longitudinal sectional view through a plating tank, showing a crankshaft plating fixture of the invention with a crankshaft mounted therein; the plating current wiring being illustrated diagrammatically.

As shown in the drawing at Fig. 15, the objective of the apparatus and process of the present invention is to provide upon a cylindrically surfaced bearing portion of a crankshaft designated 20, a precisely dimensioned plating of chromium or the like as indicated at 22. To accomplish this, the crankshaft bearing portion base metal must first be ground to remove all irregularities and to reduce its diameter so that a subsequent plating of chromium of the desired thickness thereon will bring the diameter back to the specified finished dimension. Thus, for example, as illustrated in Fig. 16, the original surface 24 of the base metal bearing portion 20 may be ground down such as to the level designated 26; and it should be noted that the base metal grinding operation is performed so as to provide rounded fillets 28—28 merging into the cheek plate portions 29—29 of the crankshaft cheeks 29—29.

Whereas it has been thought desirable or permissible to chromium plate such bearing surfaces, including the fillet areas, it has since been determined undesirable inasmuch as such fillets in practice do not function as bearing surfaces and do not touch the mating bearing. Further such fillet areas are in general subjected to higher stresses in operation than other sections of the crankshaft. Accordingly it is a particular feature of the present invention that subsequent to the base metal grinding operation, an improved anode is mounted to encircle the bearing surface and to include at the opposite sides thereof, insulating rings as indicated at 30—30 (Fig. 17) to preclude deposition of chromium in the fillet areas.

The inner bore portions of the rings are of rounded sectional form so as to complement the profiles of the fillet sections of the bearing throughout the width thereof and to terminate at their inner edges in precise bearing relation against the flat bearing surface previously formed by the pregrinding operation referred to hereinabove, The plating operation is then performed, as will be explained in detail hereinafter, until a plated layer of excess thickness is applied to the bearing surface, as indicated at 32 (Fig. 17). The plating fixture is then removed from the plating tank, and the anodes removed from the crankshaft; whereupon the crankshaft is removed to a fine grinding or outside honing or superfinishing machine in which the plated surfaces 32 are finished down precisely to the prescribed dimension and smooth surfaced form, as indicated at 22 (Fig. 15). Throughout the plating operation the side rings of the anodes prevent deposition of the plating metal in the fillet areas 28—28, and thus the finished product will appear in section as illustrated at Fig. 15.

An apparatus for plating the crankshaft bearing surfaces as aforesaid is illustrated generally in Figs. 1, 2, 3, wherein it will be seen that the apparatus includes a plating tank designated 40 which is of generally rectangular form and fabricated of any suitable sheet material, as is well understood in the art. The fixture for mounting the crankshaft to be processed is designated generally at 44, and comprises an open rectangularly shaped framework fabricated of standard metal stock pieces including a pair of rails 46—46 interconnected by cross members 47 so as to be disposed in parallel relation lengthwise of the plating tank, and to rest at their opposite ends upon the ends of the plating tank, as shown in Fig. 1. Stirrups 48 extend downwardly from the rails 46—46 and carry pillow block bearings 49, 49 into which are journaled non-bearing axial portions of the crankshaft to be processed; the mounted crankshaft being illustrated in the drawing at 50. Thus, the crankshaft is mounted to be freely rotatable in the fixture bearings 49—49 about the axis of the main bearings of the crankshaft. A false end plate as indicated at 52 (Figs. 1, 2) is bolted to one end of the crankshaft 50 and carries a sprocket 53 engaging an endless chain 54 which is driven through means of a speed reducer 55 by a motor 56.

Thus, it will be appreciated that operation of the motor 56 will drive the crankshaft 50 to rotate slowly in the fixture suspension; the main bearing portions of the crankshaft moving in simple rotation about their aligned axes while the pin bearing portions of the crankshafts revolve with planetary motions. The apparatus is arranged so that during this operation all of the parts are submerged within the electroplating bath 60 contained within the tank 40. Fig. 18 illustrates another means for mounting the crankshaft in the fixture whenever it is desired to avoid damage to surfaces of the crankshaft or whenever the crankshaft embodies no available surface to receive the bearing 49 as shown in Fig. 1. In such case a stub shaft 61 is bolted to the end face of the crankshaft 50 and is journalled in the stirrup bearing 49. The drive chain sprocket 53 is then bolted to the other end of the stub shaft 61.

As shown in Figs. 1 and 3, an electrolyte circulation manifold 62 extends longitudinally along the center line of the bottom of the plating tank, and terminates in vertical standpipes 64—64 at the opposite ends of the tank. The standpipes are apertured at the desired upper level of the electrolyte bath as indicated at 66—66, and the manifold 62 is apertured at spaced intervals as indicated at 68. Propellered circulators as indicated at 70—70 are disposed in the standpipes and are arranged to be driven by electric motors 72—72 in such manner that the electrolyte within the plating tank is constantly under circulation, as indicated by the directional arrows in Fig. 1.

By this method, electrolyte is being constantly drawn from across the upper level of the plating bath toward the opposite ends of the plating tank, and is then circulated downwardly through the standpipes and into the manifold from which it projects upwardly again at spaced intervals longitudinally of the plating tank. By means of this system remarkably uniform temperature and chemical strength characteristics are readily maintained in the plating bath. Electrical resistance immersion type heaters as indicated at 75, actuated by thermostat controls 76, or any other suitable heater devices are arranged at appropriate intervals in the bottom portion of the plating bath as shown in Figs. 1, 2, to maintain the plating bath at the proper temperature, as is well known in the art.

The plating anode devices of the apparatus of the present invention comprise generally cylindrical-shaped housings encircling the bearing portions to be plated, and embodying constructional features which will now be described in detail. As shown in Figs. 4–8 inclusive, one form of anode of the invention is shown applied to the pin offset or pin bearing portions of the crankshaft. In this form the main anode structure is of two-piece form comprising semi-circular top and bottom rings 80—81 fitted with mating flanges 82—82 at their abutting end portions for detachable assembly by means of bolts 84. Semi-circularly shaped anode liners of lead as indicated at 86—86 reside within the housing rings 80, 81, and are so dimensioned that when in assembled relation they define an inner cylindrical bore of a diameter slightly larger than the diameter of the bearing surface to be processed.

End rings 88—88 formed of sheet plastic material or the like are mounted to "float" upon the crankshaft pin at opposite sides of the anode structure, thereby masking the undercut fillet areas as indicated at 89 (Fig. 7) of the crankshaft base metal. Spacer bars as indicated at 90 (Figs. 7–8) are set into the anode liners 86 to project radially inwardly therefrom so as to center the anode in relation to the crankshaft pin. The spacers 90 are held in position by screws as indicated at 92, whereby the anode rings 86—86 may be precisely centered upon the crankshaft pin in uniformly spaced relation thereabout to assure uniform current distribution across the plating gap around the pin, although they are preset to allow proper clearances in relation to the crankshaft pin in order to accommodate build-up of plated metal to the prescribed thickness thereon during the subsequent plating operation.

Electrolyte circulation apertures in any preferred shape such as slots or holes as indicated at 95 may be drilled or otherwise formed through the anode structures, either all around the anode or only in localized areas such as at the top and bottom sections thereof as shown in the drawing, to permit free circulation of electrolyte from the main tank into the annular spaces between the pin bearings and the anode ring mmbers 86. As illustrated in Figs. 9 and 10, the end rings 88 may be conveniently fabricated by simply stamping annular pieces from flat sheet stock, and initially cutting through the annulus at one side thereof, as indicated at 96 (Fig. 9). The rings may then be mounted upon the crankshaft pin portions 20, as shown in Fig. 10, by simply twisting the ring pieces around the shaft pin until they reassume their normal shapes with their end portions meeting again in complementary fashion. By pressing a hot iron or the like against the abutting end portions, they may then be readily heat-sealed or welded together as indicated at 97 (Fig. 9).

To support the weights of the anode devices and to facilitate their maintenance in concentrically spaced relation to the crankshaft pins, each anode is suspended by means of a metal strap or the like as indicated at 100 which is bolted or otherwise suitably affixed to the top of the anode structure as indicated at 102. The straps 100 extend upwardly between spaced guide rods 104 (Figs. 1, 3) supported by cross rods 105 on the fixture frame, and engage at their upper ends with flexible cables 106 training over pulleys 108 and carrying at their other ends counterweights 110. Thus, as the crankshaft pins revolve about the longitudinal axis of the crankshaft with planetary motions, the associated anodes assume the same motions while the counterweights 110 float upwardly and downwardly on their pulley supports thereby assuming at all times the weight of the anode and connected apparatus without interference with the anode motions. As shown in Figs. 1 and 3, the plating current wiring connections for the anodes are readily made by means of flexible connectors as indicated at 112; the return conductors being connected to lead away from the plating tank frame, as indicated at 114.

A slightly modified form of anode structure is illustrated herein as being mounted in conjunction with the main bearing portions of the crankshaft being processed. Thus, for example, as illustrated in Figs. 11-14 inclusive, the anode structures thereof are generally similar to the anode structures of Figs. 4-8, but differ therefrom in that the side ring members 116 are formed of relatively thick and rigid sheet plastic stock material and are firmly fixed to the anode base structure, as by means of machine screws 118. In this construction the end rings 116—116 are of sufficient structural strength and rigidity as to be adapted to function not only as electrolyte masking devices against the fillet portions of the crankshaft base metal, but also as centering devices for centering the anodes relative to the crankshaft bearings, thereby eliminating need for spacer blocks as shown as 90 (Figs. 7, 8), and also eliminating need for counterweighting as described hereinabove.

It will of course be appreciated that in connection with the plating of bearing surfaces having recessed fillets as indicated in Fig. 7, for example, the end rings 88 must of necessity be of relatively thin sheet form so as to avoid masking any substantial areas of useful bearing surface. As a consequence, such end rings will probably be of insufficient structural strength to enable them to support the weight of the anode and its electrical connections. Hence, in this case the use of centering plates and counterweights as explained hereinabove is to be preferred. In any case the use of counterweights is preferred as explained hereinabove because they operate to avoid any hard rubbing contacts between the anode structures and the surfaces being plated, and otherwise relieve the anode structure of operational loads.

It is a particular feature of the anode construction of the present invention that the lead ring components 86—86 thereof completely encircle the crankshaft bearing surfaces, and thus the plating operation is conducted at a rate much faster for example, as the rate of operation in connection with only a semi-circular anode structure. Another outstanding feature of the anode construction of the present invention is that it provides complete enclosure of the surface being plated, thereby insulating the entire structure against stray currents and current losses. Furthermore, a perfect matching of the anode and cathode surfaces is facilitated and maintained throughout the operation, whereby uniform current density and distribution and metal deposit along the entire crank pin surface is obtained. The end ring components of the anode structure perform multiple functions in that they prevent stray current losses; carry the weight of the anode on surfaces which are not to be plated; and prevent plating of the fillet areas, thereby avoiding any change in strength of such critically stressed areas during subsequent service of the crankshaft.

It will of course be appreciated that when the crankshaft to be processed is mounted in the plating fixture, and the electrical conductors are connected thereto preliminary to the plating operation, the exterior surfaces of the anodes are preferably masked by means of some suitable lacquer or plastic substance to insulate the anodes and to prevent current flows to non-bearing portions of the crankshaft. For example, as illustrated in Figs. 7, 8, 11, 12, the anode structures may be dipped into or brushed with a suitable plastic substance to provide thereon an electrically insulative coating as indicated at 150.

What is claimed is:

1. In an apparatus for electroplating bearing surfaces of a crankshaft when disposed in a plating tank containing a plating bath, means mounting such a crankshaft with its longitudinal axis disposed substantially horizontally beneath the surface of the plating bath and for rotating said shaft about its longitudinal axis whereby the crank pin bearing portions thereof describe planetary motions, a plurality of anodes each mounted upon one of the bearings to be plated, each anode comprising paired semi-circular anode sections detachably interconnected to encircle the surface to be plated in uniformly spaced relation therefrom, an end ring disposed at each end of each anode at the ends of the surfaces to be plated and closing the gap between each such anode and its associated bearing surface, the walls of said anodes being apertured to cause circulation of electrolyte from the main plating bath into and out of said gap, means connected to said anodes permitting only limited oscillation thereof about their center lines as the crankshaft is rotated so as to effect relative rotation between said anodes and the crank pins, spacer bars extending radially inwardly from each anode toward the surface to be plated but preset at predetermined distances short thereof so as to substantially center each anode relative to its associated bearing surface while allowing for plating of metal thereon to the specified depth, electroplating current connection means attached to said anodes and movable therewith, and counterweighting devices operably attached to said anodes to balance the dead weights thereof;

2. In an apparatus for electroplating bearing surfaces of a crankshaft, when disposed in a plating tank containing a plating bath, means mounting such a crankshaft with its longitudinal axis disposed substantially horizontally beneath the surface of the plating bath and for rotating said shaft about its longitudinal axis within said bath, an anode mounted upon a bearing surface to be plated, said anode encircling the surface to be plated in uniformly spaced relation therefrom, means connected to said anode permitting only limited oscillation thereof about its center line as the crankshaft is rotated so as to effect relative rotation between said anode and the crank pin, a full circle end ring disposed at each end of said anode at the ends of the surface to be plated and closing the gap between said anode and said bearing surface, said anode being shaped to cause circulation of electrolyte from the main plating bath into and out of said gap, electroplating current connection means attached to said anode and movable therewith, and counterweighting devices operably attached to said anode to balance the dead weight thereof.

3. In an apparatus for electroplating bearing surfaces recess-filled into the cheeks of a crankshaft, when disposed in a plating tank containing a plating bath, means mounting such a crankshaft with its longitudinal axis disposed substantially horizontally beneath the surface of the plating bath and for rotating said shaft about its longitudinal axis therein, an anode mounted about a bearing surface to be plated, said anode comprising paired semi-circular anode sections detachably interconnected to encircle the surface to be plated in uniformly spaced relation therefrom, a thin end ring disposed at each end of said anode at the ends of the surfaces to be plated and against the crankshaft cheeks and closing off the recessed fillets, and closing the gap between said anode and said bearing surface, means connected to said anode permitting only limited oscillation thereof about its center line as the crankshaft is rotated so as to effect relative rotation between said anode and the crank pin, spacer bars extending radially inwardly from said anode toward the surface to be plated but preset at predetermined distances short thereof so as to substantially center the anode relative to the bearing surface while allowing for plating of metal thereon to the specified depth, electroplating current connection means attached to said anode and movable therewith, and counterweighting devices operably attached to said anode to balance the dead weight thereof.

4. In an apparatus for electroplating bearing surfaces of a crankshaft when disposed in a plating tank containing a plating bath, means mounting such a crankshaft with its longitudinal axis disposed substantially horizontally and for rotating said shaft about its longitudinal axis whereby the crank pin bearing portions thereof describe planetary motions, a plurality of anodes each mounted upon one of the bearings to be plated, each anode encircling the surface to be plated in uniformly spaced relation therefrom, means connected to said anodes permitting only limited oscillation thereof about their center lines as the crankshaft is rotated so as to effect relative rotation between said anodes and the crank pins, an end ring disposed at each end of each anode at the ends of the surfaces to be plated and closing the gap between each such anode and its associated bearing surface, the walls of said anodes being apertured at top and bottom thereof to cause circulation of electrolyte from the main plating bath into and out of said gap, spacer bars extending radially inwardly from each anode toward the surface to be plated so as to substantially center the anode relative to the bearing surface while allowing for plating of metal thereon to the specified depth, electroplating current connection means attached to said anodes and movable therewith, and counterweighting devices attached to said anodes tending to lift the latter to balance the dead weights thereof.

5. In an apparatus for electroplating bearing surfaces of a crankshaft when disposed in a plating tank containing a plating bath, means mounting such a crankshaft with its longitudinal axis disposed substantially horizontally and for rotating said shaft about its longitudinal axis whereby the crank pin bearing portions thereof describe planetary motions beneath the surface of the plating bath, a plurality of anodes each mounted upon one of the bearings to be plated, each anode comprising paired semicircular anode sections detachably interconnected to encircle the surface to be plated in uniformly spaced relation therefrom, means connected to said anodes permitting only limited oscillation thereof about their center lines as the crankshaft is rotated so as to effect relative rotation between said anodes and the crank pins, spacer bars extending radially inwardly from each anode toward the surface to be plated but preset at predetermined distances short thereof so as to substantially center the anodes relative to the bearing surface while allowing for plating of metal thereon to the specified depth, electroplating current connection means attached to said anodes and movable therewith, and counterweighting devices operably attached to said anodes tending to lift the latter to balance the dead weights thereof.

References Cited in the file of this patent

UNITED STATES PATENTS

| | | |
|---|---|---|
| 593,837 | Dunton | Nov. 16, 1897 |
| 1,880,382 | Garling | Oct. 4, 1932 |
| 2,530,677 | Berkenkotter | Nov. 21, 1950 |
| 2,710,834 | Vrilakas | June 14, 1955 |